July 4, 1950 F. R. HENSEL ET AL 2,513,323
FLUTED SPOT WELDING ELECTRODE
Filed June 3, 1947 2 Sheets-Sheet 1
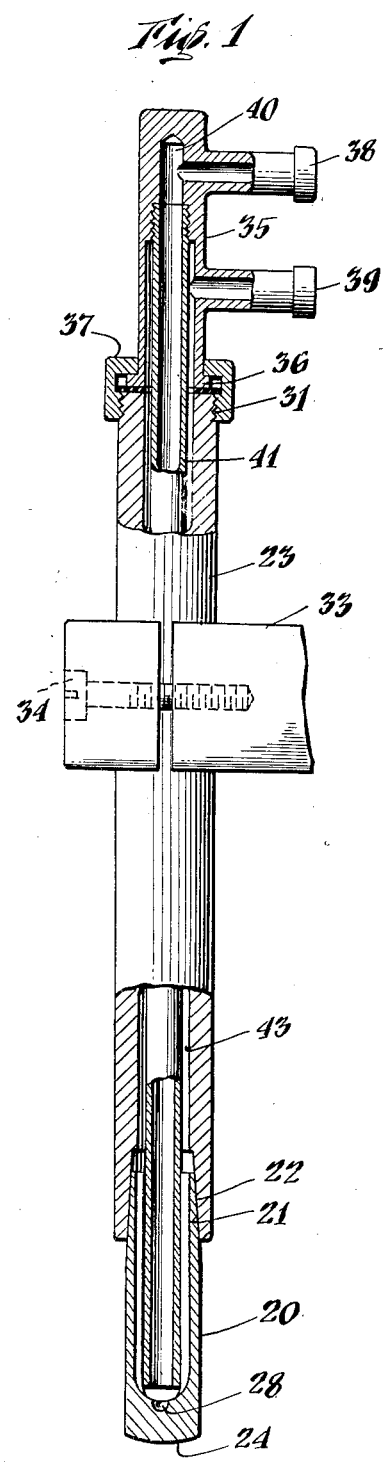
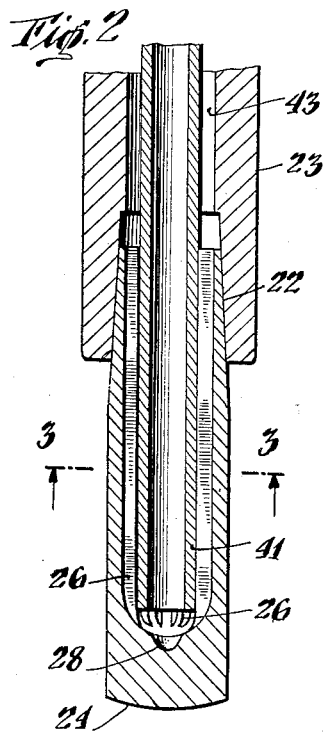
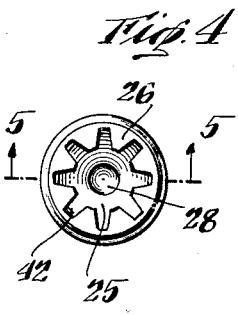
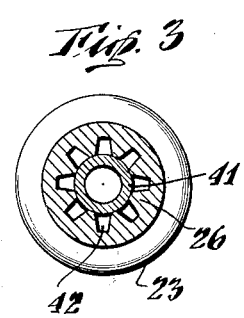
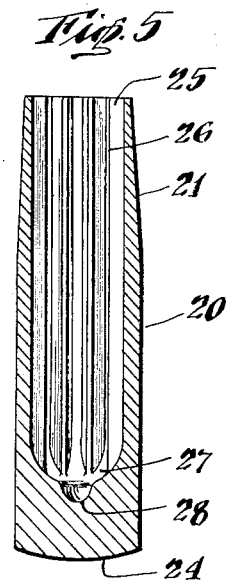
Franz R. Hensel
Earl I. Larsen
Edman F. Holt
INVENTORS
BY Nicholas Lang
ATTORNEY July 4, 1950   F. R. HENSEL ET AL   2,513,323
FLUTED SPOT WELDING ELECTRODE
Filed June 3, 1947   2 Sheets-Sheet 2
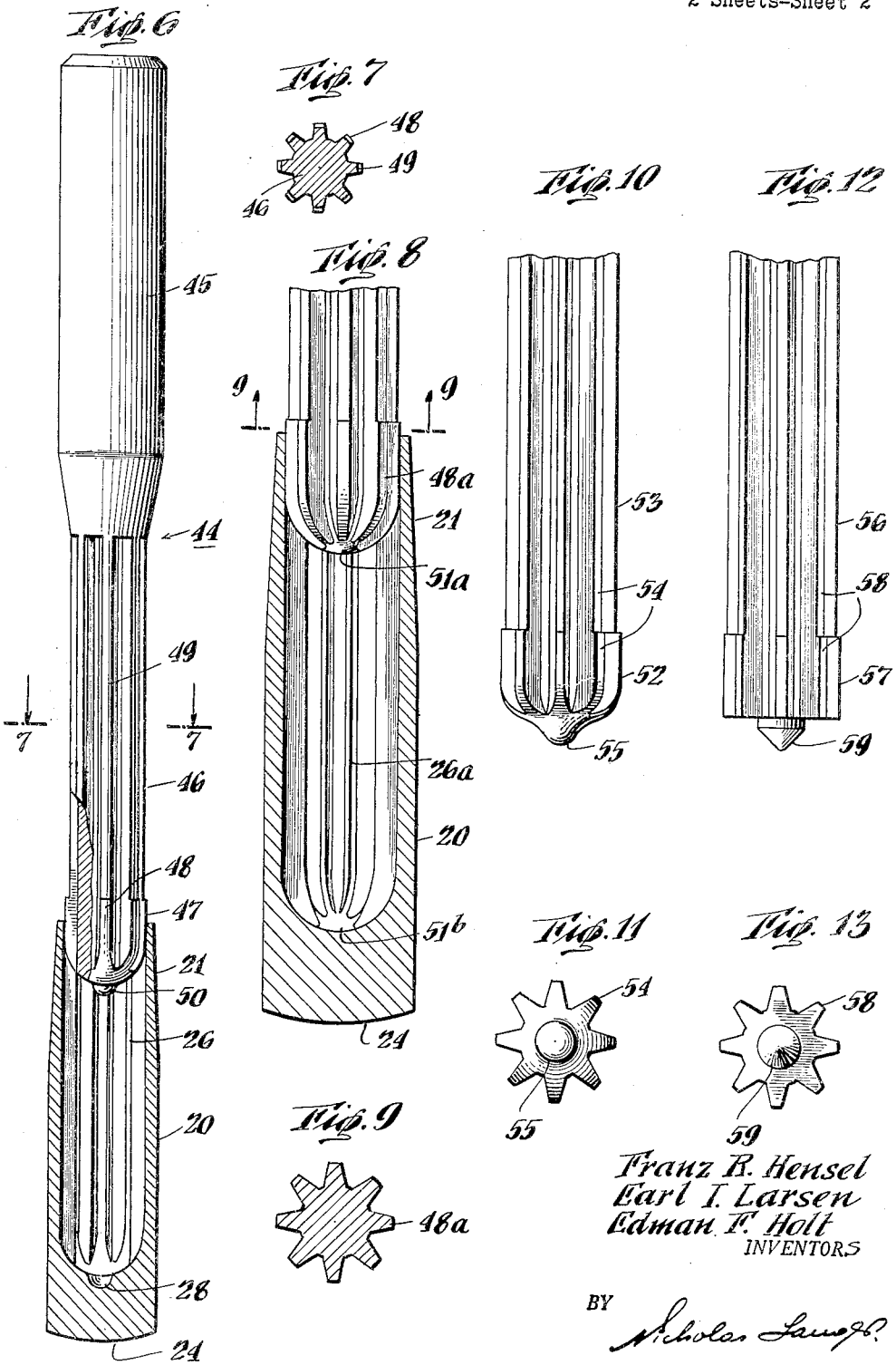
Franz R. Hensel
Earl I. Larsen
Edman F. Holt
INVENTORS
BY Nicholas Laurif?
ATTORNEY Patented July 4, 1950

2,513,323

UNITED STATES PATENT OFFICE 2,513,323

FLUTED SPOT WELDING ELECTRODE

Franz R. Hensel, Earl I. Larsen, and Edman F. Holt, Indianapolis, Ind., assignors to P. R. Mallory & Co., Inc., Indianapolis, Ind., a corporation of Delaware Application June 3, 1947, Serial No. 752,144

9 Claims. (Cl. 219—4)

The present invention relates to the art of resistance welding, and, more particularly, to pressure exerting welding electrodes having greatly increased cooling efficiency.

Conventional resistance or spot welding electrodes are generally provided with a rounded recess extending into the body of the electrode and ending short of the work-engaging surface thereof. According to current practice, a coolant fluid is circulated in the recess, such fluid being introduced into the recess through a coolant tube projecting into the recess and being discharged therefrom through the annular channel defined by the outer surface of the coolant tube and the inner surface of the recess.

This conventional practice of cooling resistance or spot welding electrodes was not completely satisfactory and was particularly deficient when welding metals of relatively high electrical conductivity, such as for example aluminum. Welding such highly conducting metals requires extremely high welding currents causing excessive heating of the electrode body. Excessive temperature rise in the electrode body causes rapid deformation of the work-engaging face of the electrode and necessitates frequent redressing or reshaping. Also, it increases the tendency of alloying between the electrode face and the material being welded.

To improve the heat exchange between the electrode and the coolant fluid, it was already suggested to increase the effective surface of the coolant hole or recess. Such prior suggestions included, for example, the provision of a spiral groove or some type of rib on the recess walls. These expedients, however, were of a very problematical value as the production of such surface structures in a recess open only at one end by machining operations was extremely difficult and the cost was prohibitive.

Other suggestions in this direction involved making the electrode of two pieces, one of which was tubular and constituted the body portion of the electrode and the other was solid and constituted the bottom of the coolant hole and the work-engaging face of the electrode. These two pieces were first grooved by machining or similar mechanical operations and then were soldered together. Of course, this procedure was likewise quite expensive and provided an electrode with a soldered joint of high heat and electrical resistance in the critical region where the complete absence of such resistance is extremely important. For this reason, composite electrodes of this type never achieved commercial success for heavy duty applications of the character contemplated by the present invention.

From the foregoing considerations, it is clear that the art was faced with a serious problem for which no fully satisfactory solution was known.

We have discovered that the outstanding problem may be solved in a remarkably simple manner.

It is an object of the present invention to provide a welding electrode of increased cooling efficiency which eliminates the difficulties and inconveniences experienced with conventional welding electrodes.

It is another object of the present invention to provide an improved welding electrode integrally formed of a single piece of metal and having a coolant hole therein with integral splines or flutes, which greatly increase the effective heat exchange surface area between the electrode and the coolant fluid.

It is also within the contemplation of the invention to produce an internally fluted welding electrode by extrusion from a single piece of metal.

The invention also contemplates an internally fluted or splined welding electrode of greatly increased cooling efficiency which is extremely simple in construction, which is integrally formed of a single piece of metal and which may be readily manufactured on a quantity production scale at a low cost.

Other and further objects and advantages of the invention will become apparent from the following description, taken in conjunction with the accompanying drawings; in which:

Figure 1 is a vertical sectional view, having parts in elevation, of a welding electrode and its holder embodying the principles of the present invention;

Figure 2 is a similar sectional view, drawn to a larger scale, of the electrode and of the lower end portion of the electrode holder shown in Figure 1, with the coolant tube protruding into the recess of the electrode;

Figure 3 is a section taken on line 3—3 of Figure 2;

Figure 4 is a top elevational view of the electrode shown in Figures 1 to 3;

Figure 5 is a longitudinal section taken on line 5—5 of Figure 4;

Figure 6 is a view illustrating the welding electrode shown in Figures 1 to 5 during its process of manufacture;

Figure 7 is a section taken on line 7—7 of Figure 6;

Figure 8 is a longitudinal sectional view, having parts in elevation, of a modified welding electrode embodying the invention and of portions of a tool for making the same;

Figure 9 is a section taken on line 9—9 of Figure 8;

Figure 10 is a side elevational view of a punch for making another modified form of welding electrode;

Figure 11 is an end view of the punch shown in Figure 10;

Figure 12 is a side elevational view of a punch for making a further modified form of welding electrode; and Figure 13 is an end view of the punch shown in Figure 12.

Broadly stated, according to the principles of our invention, we provide a welding electrode having longitudinal splines or flutes on the inner surface of its coolant hole whereby the efficiency of heat exchange between the electrode and the coolant fluid is greatly improved. The longitudinal splines or flutes may be formed the entire length of the coolant recess of the electrode and they are preferably so arranged that they converge at a point in the recess bottom on the axial center line of the recess. With such a construction, the splines or flutes may serve to centrally locate the coolant tube and the converging splines in the bottom of the recess may serve to decrease turbulence in the coolant equally among the longitudinal splines of the recess wall. In this manner a generally streamlined flow of the coolant fluid is assured and turbulence or eddy currents in the coolant fluid are effectively avoided.

According to the invention, the novel electrodes are formed by extruding the electrode coolant recess with specially designed punches whose exterior contours are made with suitable splines. When the punch is forced into a solid piece of electrode material, a recess is formed whose walls match the contours of the extruding punch. The end of the punch may be provided with a small protuberance on the axial center line of the punch intended to guide the punch into the electrode metal. We have found that our extrusion process permits to make internally splined or fluted welding electrodes in a simple and efficient manner and at a low cost and that, as a result of their integral construction, such electrodes are not only much cheaper but also a great deal more efficient than prior welding electrodes in which grooves and similar surface formations were incorporated by mechanical operations, necessitating in most cases assembling the electrode from several pieces.

Referring now more particularly to Figures 1 to 5 of the drawing, reference numeral 20 generally denotes the welding electrode in the form of an elongated body of cylindrical shape made of a metal of high heat and electrical conductivity, such as a suitable copper alloy. One end of the electrode is tapered, as shown at 21, to conform to and to provide a tight fit with a corresponding tapered socket 22 of a tubular welding electrode holder 23. The other end of the electrode is formed with a convex work-engaging face 24, although, of course, the shape of said face may be subject to considerable variations in accordance with the specific application.

A coolant recess 25 extends into the electrode from the tapered end thereof, ending short of the work-engaging face of the electrode. Longitudinal splines or flutes 26 extend along the inner surface of the recess and gradually merge into the bottom of the recess at 27. The splines greatly increase the effective heat exchange area between the electrode and the coolant fluid thereby improving the cooling efficiency. A small depression 28 in the axial center line of the recess is produced by a guiding protuberance on the head of the extruding punch, as it will be explained more fully hereinafter.

The cooperation of the novel welding electrode with the welding electrode holder and the coolant tube will be best understood by referring to Figures 1 to 3. Reference numeral 23 denotes a tubular welding electrode holder having a threaded portion 31 at its upper end and a tapered electrode-receiving socket 22 at its lower end. Holder 23 is clamped at the end of arm 33 of the welding machine by means of a screw 34. A hose attachment member 35 is fluid-tightly attached to the holder by means of a shouldered portion 36 and a nut 37 and has nipples 38 and 39 integrally formed therewith for the introduction and the discharge of water or some other coolant fluid. Hose attachment member 35 is formed with a partially threaded axial recess 40, in communication with inlet nipple 38, into which is screwed coolant inlet tube 41 extending throughout the length of tubular holder 30. Outlet nipple 39 is in communication with the tubular recess in the holder. As explained in the foregoing, electrode 20 is provided with a tapered portion 21 forming a tight fit with socket 22 of the holder and its coolant recess 25 conforms to the tubular recess in holder 23 and forms a continuation thereof.

As it will be best observed in Figure 3, the raised portions of splines 26 are so constructed and arranged as to define lateral and vertical locating elements for the lower end portion of coolant tube 41, while the depressed portions of the said splines define individual coolant channels 42 at the bottom of the coolant recess where the said splines converge.

From the foregoing description, the operation of the welding electrode system embodying the principles of the present invention will be readily understood by those skilled in the art. A circulatory flow of coolant fluid is maintained through the electrode and holder by introducing such fluid through nipple 38 and withdrawing it through nipple 39. This flow is introduced into the bottom of recess 25 of the electrode through the end of coolant tube 41 where the direction of the flow is reversed and the flow is divided into a number of individual streams in the depressed portions 42 of splines 26. These individual streams merge into the annular space 43 between the outer surface of the coolant tube and the inner surface of tubular holder 30, and the combined flow is discharged through outlet nipple 39.

It will be noted that splines 26 are of such shape and arrangement that they smoothly curve and gradually merge into the bottom of the coolant recess thereby assuring a generally streamlined flow of the coolant in the critical region where the direction of the flow is reversed. This is extremely important since any turbulence of the flow in this region tends to cause the flow of coolant to break away from the surface to be cooled and the production of eddy currents which would greatly reduce the cooling efficiency. It is also to be observed that the electrode is integrally formed of a single piece of metal, including the splines or flutes thereon. This is likewise of considerable importance, experience having demonstrated that in prior grooved electrodes made of two or more pieces the increased heat and electrical resistance was sufficient to practically negative any improvement in heat exchange efficiency produced by the grooved construction of the coolant recess.

The method of making the welding electrode shown in Figures 1 to 5 will appear from Figure 6. In this figure, there is shown a punch 44, having an enlarged shank portion 45, a body portion 46, and a head portion 47. Splines 48 are circumferentially arranged on the head portion of the punch, corresponding as to their exterior contours to the surface formation of the electrode recess. The body portion of the punch is made with a slightly smaller diameter than the head portion and is likewise provided with splines 49, forming continuation of splines 48.

Shank 45 of the punch is clamped in any suitable type of a press of sufficient capacity, such as is used for forging, punching, pressing, or otherwise deforming metals. When carrying the method of the invention into practice, the punch is forced into a solid piece or slug of the electrode material, thereby to extrude a splined or fluted recess therein. In most cases the electrodes are extruded cold or at room temperature, although when extruding extremely hard electrode metals the extrusion process may be carried out at elevated temperatures. Most of the work-hardenable copper base electrode alloys, such as cadmium-bearing copper and silver-bearing copper, and many of the age-hardenable copper base electrode alloys, may be extruded with the splined punch at room temperature or cold. Extrusion with the splined punches may be facilitated by extruding the electrodes at an elevated temperature and this may be particularly helpful in extruding some of the harder heat-treatable copper base alloys.

Another method found useful in extruding extremely hard heat-treatable copper base alloy electrodes, using the splined punches, is to first quench the alloy from a relatively high temperature, in which condition the alloy is very soft and pliable. The softened electrode alloy is then extruded with the splined punch and subsequently heat treated. The latter operation in conjunction with the strain hardening occasioned by the mechanical extruding substantially restores the electrode alloy to full hardness.

Extrusion of the electrode alloy may be further facilitated by plating the slug of the alloy to be extruded with certain metals such as silver, cadmium, tellurium, or indium to decrease frictional forces during extrusion.

The extruding of the electrodes with the splined punch severely cold works the electrode metal causing substantial strain hardening and grain elongation, which propitiously affects the mechanical strength of the electrode. The increased mechanical strength afforded through the extrusion of the electrode metal permits a reduction in the electrode wall cross sectional area, thereby providing a greater area for coolant flow.

The method of extrusion of internally splined electrodes is also adaptable to the extrusion of pressed powder alloy slugs, in which case the slug to be extruded is made by compacting and sintering metal powders, such as copper powder with 3% to 20% chromium, and subsequently extruding the slug with the splined punch. The extruding of the pressed powder slug will increase the density of the compact, in turn improving the thermal and electrical conductivity, while the strain hardening will improve the mechanical properties of the alloy.

In general, the dimensions of the electrode slug are increased by the extrusion. Thus, in a practical application, the original diameter of the slug was 5/8" and its length 1.57". Upon extruding the recess to within 1/4" of the slug end, en electrode was formed having a diameter of 5/8" and a length of 2.06".

As it will be readily noted in Figure 6, the operative end of the punch is formed in a radius so that the bottom of the coolant recess will have a smooth contour to deflect the coolant stream with a minimum of turbulence. The end of the punch is further provided with a small protuberance 50 on the axial center line of the punch in order to guide the punch into the electrode metal and to keep the punch traveling on the axial center line of the electrode during the extrusion.

Figures 8 and 9 illustrate a modified electrode and the operative portion of the extrusion punch for making the same. This form of construction is closely similar to the one shown in Figure 6 and similar reference numerals have been used to denote corresponding parts. The difference between the two forms of constructions is the absence of protuberance 50 on the punch and the resulting absence of depression 28 in the coolant hole. Also, splines 48a of the punch are extended to the axial center point 51a thereof, thereby providing corresponding splines 29a in the electrode recess, terminating at the center point 51b of the bottom thereof. This form of recess further improves the streamlined character of the coolant flow at the bottom of the recess.

Figures 10 and 11 illustrate a somewhat fragmentary view of another extrusion punch of modified construction. Both head portion 52, as well as body portion 53, are provided with circumferentially spaced longitudinal splines 54, the splines in the body portion being somewhat relieved. In the head portion of the punch, the said splines curve and merge into a smooth contoured protuberance 55 in a generally streamlined manner, thereby assuring a smooth flow of metal during extruding.

Figures 12 and 13 illustrate a similar view of another extrusion punch embodying the invention, comprising a body portion 56 and a head portion 57, both having longitudinal splines 58 extending on the circumferential surface thereof. A sharp-pointed guiding protuberance 59 is provided in the center of the head portion. While as a result of the straight edge shape of the head, this punch does not displace the metal as smoothly as the punches described in the foregoing, it was found to produce satisfactory results, particularly when extruding electrodes from metals of moderate hardness.

While the present invention, as to its objects and advantages, has been disclosed herein as carried out in specific embodiments thereof, it is not desired to be limited thereby but it is intended to cover the invention broadly within the spirit and scope of the appended claims.

What is claimed is:

1. An electrode for resistance welding comprising an elongated body integrally extruded of a single piece of metal adapted to be clamped in a holder at one end thereof and having a work-engaging contact surface at the other end thereof, a coolant hole extending in said body from the clamped end towards but terminating short of said contact surface, a shallow depression in the center of the bottom surface of said coolant hole, and a plurality of spaced longitudinal flutes along the inner surface of said hole converging towards said depression in the center of the bottom surface thereof in a generally streamlined configuration, said flutes substantially increasing the area of contact between said body and a coolant fluid circulated in said hole.

2. A pressure exerting welding electrode comprising an elongated body integrally extruded of a single piece of metal, said body having a tapering clamping surface at one end thereof engageable with a corresponding surface in a holder and having a contact surface at the other end thereof engageable with a work piece, a coolant hole coaxially extending in said body towards its work-engaging end and open at its clamped end, a shallow depression in the axial center of the bottom surface of said hole, and a plurality of longitudinal flutes in the inner surface of said hole increasing the area of contact between said surface and the coolant fluid, said flutes being circumferentially spaced from each other and converging towards each other in a continuous streamlined configuration to terminate at said shallow depression in the axial center of the bottom surface of the hole.

3. A pressure exerting welding electrode comprising a body integrally extruded of a single piece of metal having a coolant hole therein open at the clamped end thereof and extending towards the work-engaging end thereof, and a plurality of longitudinal splines circumferentially arranged along the inner surface of said hole and merging in the bottom of the hole in a continuous and streamlined manner free from sudden changes in direction thereby providing a heat exchange surface of greatly increased area between said metal body and a coolant fluid circulated in said hole, the raised portions of said splines respectively defining lateral and vertical locating elements for the sides and the end of a coolant tube and the depressed portions of said splines defining individual coolant channels communicating with said tube at the bottom of said hole where said splines converge.

4. A pressure exerting welding electrode comprising an elongated body integrally extruded of a single piece of metal of high heat and electrical conductivity, said body having a tapered clamping surface at one end thereof engageable with a corresponding tapered surface in a holder and having a contact surface at the other end thereof engageable with a work piece, a coolant hole axially extending in said body towards its work-engaging end and opening into its clamped end, a plurality of longitudinal flutes in the inner surface of said hole increasing the area of contact between said surface and a coolant fluid, said flutes being circumferentially spaced from each other and converging towards each other in a continuous streamlined configuration to terminate in the region of the axial center of the bottom surface of the hole, and a shallow depression in said region in which the said flutes terminate.

5. A pressure exerting welding electrode system comprising in combination a tubular electrode holder adapted to be clamped to the arms of a welding machine, an electrode integrally extruded of a single piece of metal secured to said holder having a coolant hole therein with a shallow depression in the center of the bottom surface of the hole, longitudinal flutes extending along the inner surface of said hole and merging into said depression in the bottom of the hole, an inlet tube for coolant fluid extending through said holder into the hole in said electrode, and conduit means for maintaining a circulatory flow of coolant fluid through said tube, coolant hole and holder, said flutes providing a greatly increased and streamlined heat exchange surface between the circulating coolant fluid and the entire surface of the coolant hole including said depression in the bottom surface of said hole where said flutes merge.

6. A pressure exerting welding electrode system comprising in combination a tubular electrode holder having a tapered socket at one end thereof, an electrode integrally extruded of a single piece of metal having one of its ends held in said socket and having a coolant hole communicating with said holder, said hole having a plurality of longitudinal splines which curve and merge into the bottom center of said hole, an inlet tube for coolant fluid extending through said holder into the hole in said electrode and having its end held between the raised portions of said splines, and conduit means for introducing coolant fluid into said hole through said inlet tube and for discharging such fluid therefrom through said tubular holder, said splines providing a generally streamlined heat exchange surface of greatly increased area between the said electrode and the coolant fluid.

7. A pressure exerting welding electrode comprising a body integrally extruded of a single piece of metal having a coolant hole therein open at the clamped end thereof and extending towards the work-engaging end thereof, a shallow depression of generally rounded cross section in the bottom center of said coolant hole, and a plurality of longitudinal splines circumferentially arranged along the inner surface of said hole and merging into said shallow depression in the bottom of the hole in a continuous and streamlined manner free from sudden changes in direction thereby providing a heat exchange surface of greatly increased area between said metal body and a coolant fluid circulated in said hole, the raised portions of said splines respectively defining lateral and vertical locating elements for the sides and the end of a coolant tube and the depressed portions of said splines defining individual coolant channels communicating with said tube in the region of said shallow depression at the bottom of said hole where said splines converge.

8. A pressure exerting welding electrode comprising a body integrally extruded of a single piece of metal having a coolant hole therein open at the clamped end thereof and extending towards the work-engaging end thereof, said hole having a plurality of longitudinal splines on the inner surface thereof which curve and merge into the bottom center of said hole, the raised portions of said splines being adapted to hold the end of a coolant tube positively located therebetween, said splines providing a generally streamlined heat exchange surface of greatly increased area between the said electrode and a coolant fluid circulated through said hole.

9. A pressure exerting welding electrode comprising a body integrally extruded of a single piece of metal having a coolant hole therein open at the clamped end thereof and extending towards the work-engaging end thereof, said hole including a shallow depression in the center of its bottom surface and having a plurality of longitudinal splines on the inner surface thereof which curve and merge into said shallow depression, the raised portions of said splines being adapted to hold the end portions of a coolant tube positively located therebetween, said splines providing a generally streamlined heat exchange surface of greatly increased area between the said electrode and a coolant fluid circulated through said hole.

FRANZ R. HENSEL.
EARL I. LARSEN.
EDMAN F. HOLT.

REFERENCES CITED

The following references are of record in the file of this patent:

UNITED STATES PATENTS

| Number | Name | Date |
|---|---|---|
| 2,250,645 | Meadowcraft et al. | July 29, 1941 |
| 2,351,230 | Powell | June 13, 1944 |
| 2,355,145 | Carlson | Aug. 8, 1944 |
| 2,379,983 | Munson | July 10, 1945 |
| 2,446,932 | Johnson | Aug. 10, 1948 |

FOREIGN PATENTS

| Number | Country | Date |
|---|---|---|
| 15,555 | Great Britain | Sept. 24, 1898 |